United States Patent
Martin et al.

(10) Patent No.: US 9,429,084 B2
(45) Date of Patent: Aug. 30, 2016

(54) METHODS AND SYSTEMS FOR OPERATING AN ENGINE IN A HYBRID VEHICLE DRIVELINE

(71) Applicant: Ford Global Technologies, LLC, Dearborn, MI (US)

(72) Inventors: Douglas Raymond Martin, Canton, MI (US); Kenneth James Miller, Canton, MI (US); Stephen Li-Chun Shen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/470,843

(22) Filed: Aug. 27, 2014

(65) Prior Publication Data

US 2016/0061121 A1  Mar. 3, 2016

(51) Int. Cl.

| | | |
|---|---|---|
| *F02D 29/02* | (2006.01) | |
| *B60W 30/18* | (2012.01) | |
| *B60W 10/06* | (2006.01) | |
| *B60W 10/08* | (2006.01) | |
| *B60W 20/00* | (2016.01) | |

(52) U.S. Cl.
CPC .............. *F02D 29/02* (2013.01); *B60W 10/06* (2013.01); *B60W 10/08* (2013.01); *B60W 20/10* (2013.01); *B60W 2510/0666* (2013.01); *B60W 2710/0677* (2013.01); *Y10S 903/902* (2013.01)

(58) Field of Classification Search
CPC ..... B60W 20/00; B60W 30/18; B60K 6/105; B60K 6/485; F02D 29/02; F16H 63/50
USPC ................. 701/22, 68; 123/179.16; 180/243; 477/110
See application file for complete search history.

(56) References Cited

U.S. PATENT DOCUMENTS

| | | | |
|---|---|---|---|
| 4,964,318 A * | 10/1990 | Ganoung .............. | B60W 30/18 123/478 |
| 7,268,442 B2 | 9/2007 | Syed et al. | |
| 8,046,125 B2 | 10/2011 | Kim | |
| 8,442,711 B2 | 5/2013 | Syed et al. | |
| 8,473,133 B2 | 6/2013 | Wang et al. | |
| 8,676,415 B2 | 3/2014 | Okubo et al. | |
| 2005/0000481 A1* | 1/2005 | Asakawa ............... | B60K 6/485 123/179.16 |
| 2009/0139789 A1* | 6/2009 | Yang ..................... | B60W 20/00 180/243 |
| 2011/0029175 A1* | 2/2011 | Kang ..................... | B60K 6/485 701/22 |
| 2012/0116626 A1 | 5/2012 | Perkins et al. | |
| 2012/0197472 A1* | 8/2012 | He ......................... | B60K 6/105 701/22 |
| 2013/0096793 A1* | 4/2013 | Krosschell ............. | F16H 63/50 701/68 |
| 2013/0166115 A1 | 6/2013 | Abihana et al. | |
| 2013/0238179 A1* | 9/2013 | Syed ..................... | B60W 20/00 701/22 |
| 2013/0268175 A1 | 10/2013 | Wang et al. | |

OTHER PUBLICATIONS

Martin, Douglas Raymond et al., "Vehicle Engine and Electric Machine Control," U.S. Appl. No. 14/154,528, filed Jan. 14, 2014, 26 pages.

* cited by examiner

*Primary Examiner* — Yuri Kan

(74) *Attorney, Agent, or Firm* — David Kelley; Alleman Hall McCoy Russell & Tuttle LLP

(57) ABSTRACT

Systems and methods for increasing hybrid driveline efficiency are disclosed. In one example, an efficient engine operating region is defined within an engine operating domain based on an engine's brake specific fuel consumption. The systems and methods may increase an amount of time a hybrid driveline operates at more efficient operating conditions.

20 Claims, 5 Drawing Sheets

METHODS AND SYSTEMS FOR OPERATING AN ENGINE IN A HYBRID VEHICLE DRIVELINE

FIELD

The present description relates to a system and method for determining desired operation conditions for a hybrid driveline. The methods and systems may be useful for a variety of hybrid drivelines including series and parallel configurations.

BACKGROUND AND SUMMARY

A hybrid vehicle may include an engine and a motor for propelling the hybrid vehicle. The engine may operate at various speeds and loads to provide a desired driver demand torque while the hybrid vehicle is operating. The engine's brake specific fuel consumption may vary significantly between different operating conditions. The changes in fuel consumption may be related to engine pumping losses, engine friction, accessory losses, knock limits, and other conditions. Consequently, it may be desirable to operate the engine at one condition to conserve fuel; however, the hybrid driveline may not be able to provide driver demand torque over a desired driveline operating range when engine torque is confined to efficient engine operating conditions. Therefore, the hybrid driveline may be operated at conditions where the engine is less efficient than is desired to meet driver demand over a wide range of vehicle speeds.

The inventors herein have recognized the above-mentioned disadvantages and have developed a method, comprising: defining an efficient engine operating region over an engine operating domain; applying a first filter to a desired engine power if the desired engine power is within the efficient engine operating region; applying a second filter to the desired engine power if the desired engine power is not within the efficient engine operating region; and commanding an engine to operate at a filtered engine power.

By applying different filters to desired engine power, it may be possible to retain engine operation within a range where engine efficiency is greater for a longer period of time, thereby improving hybrid driveline efficiency. In particular, if desired engine power is within a defined efficient engine operating range, desired engine power may be more heavily filtered so that if desired engine power exits the defined efficient engine operating range, filtered engine power may remain in the defined efficient engine operating range. The engine may be operated at the filtered engine power to increase driveline efficiency. A motor/generator may provide a difference in power between the desired engine power and the filtered engine power so that driver demand torque may be provided. On the other hand, if desired engine power is outside of the defined efficient engine operating range, the filtered engine power may be less heavily filtered so that if desired engine power enters the defined efficient engine operating range, filtered engine power may enter the defined efficient engine operating range sooner than if desired engine power were filtered as if desired engine power was in the defined efficient engine operating range.

The present description may provide several advantages. In particular, the approach may improve vehicle efficiency. Additionally, the approach may provide fewer transitions between engine operating conditions. Further, the approach may provide lower vehicle emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
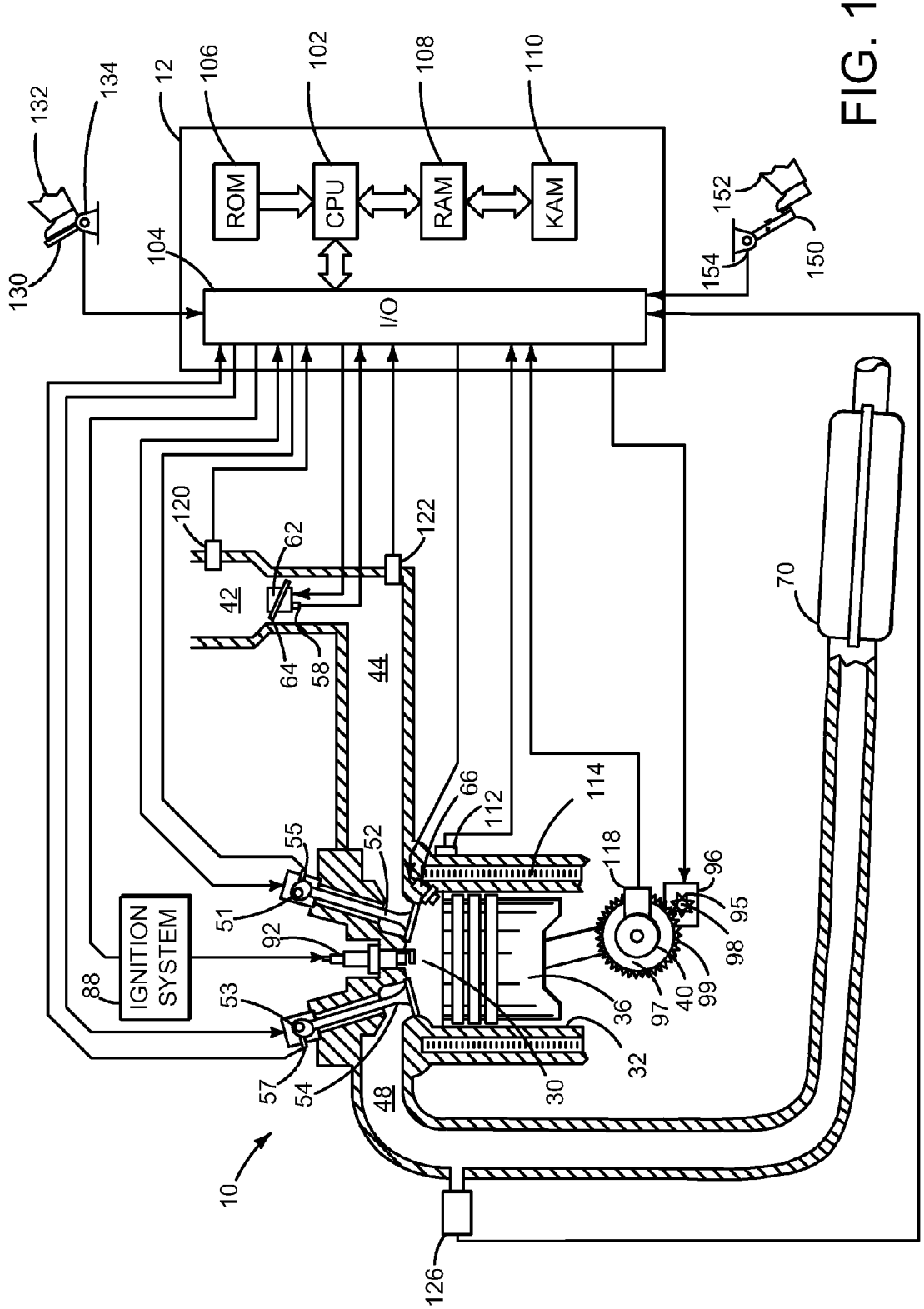
FIG. 1 is a schematic diagram of an engine.
Figure 2:
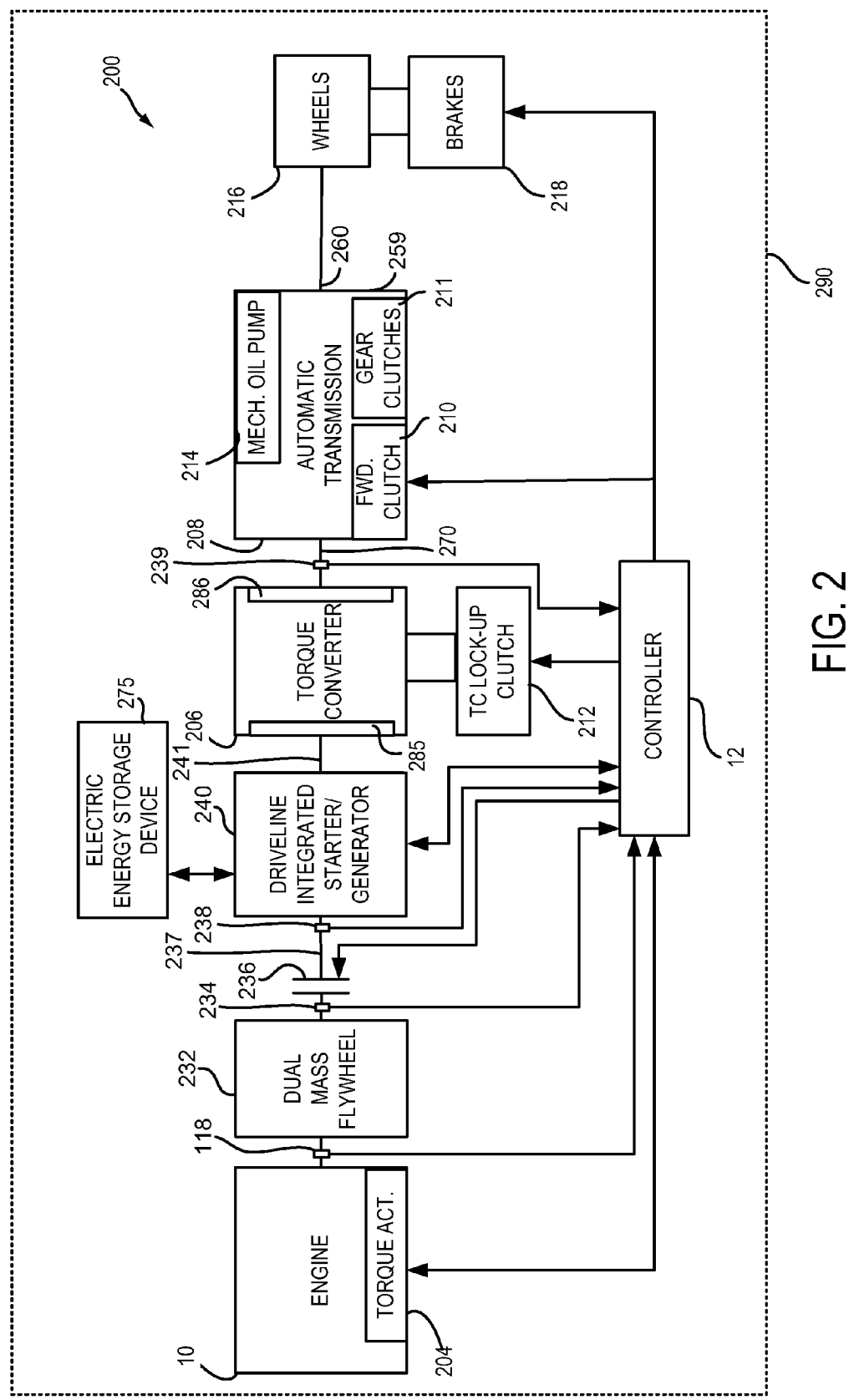
FIG. 2 shows a first example vehicle driveline configuration.
Figure 3:
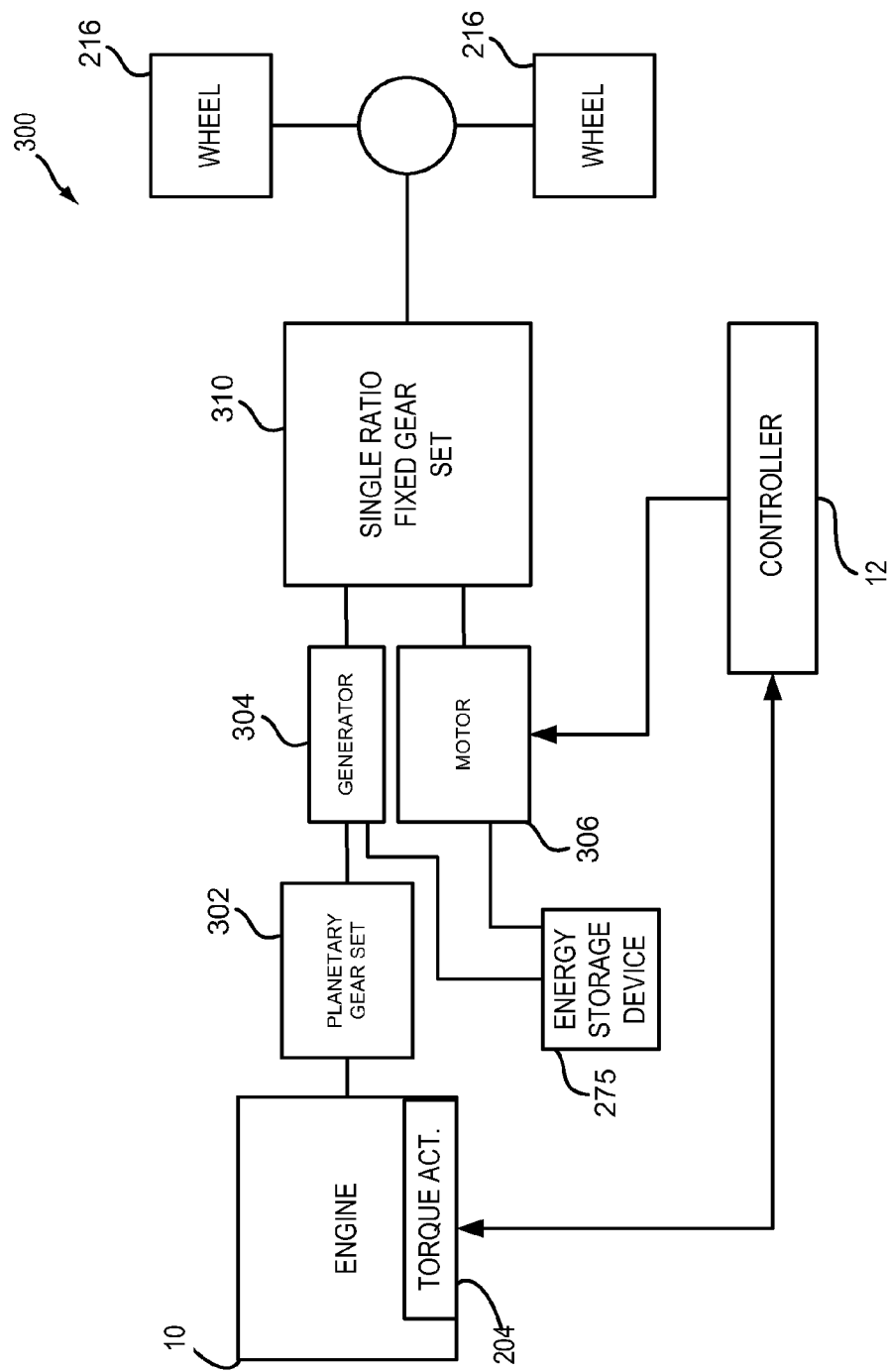
FIG. 3 shows a second example vehicle driveline configuration.
Figure 4:
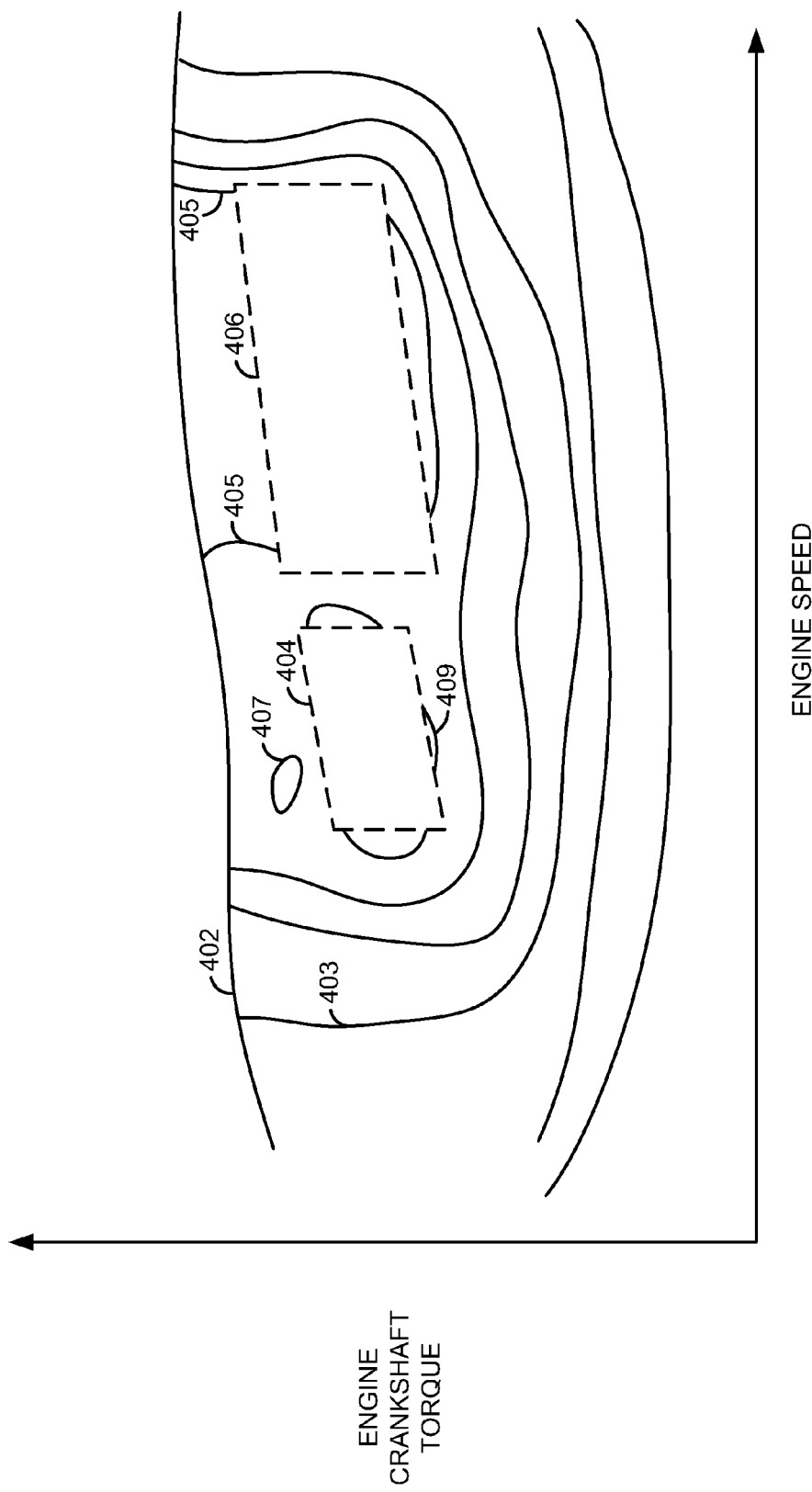
FIG. 4 shows example defined efficient engine operating regions over an engine operating domain.
Figure 5:
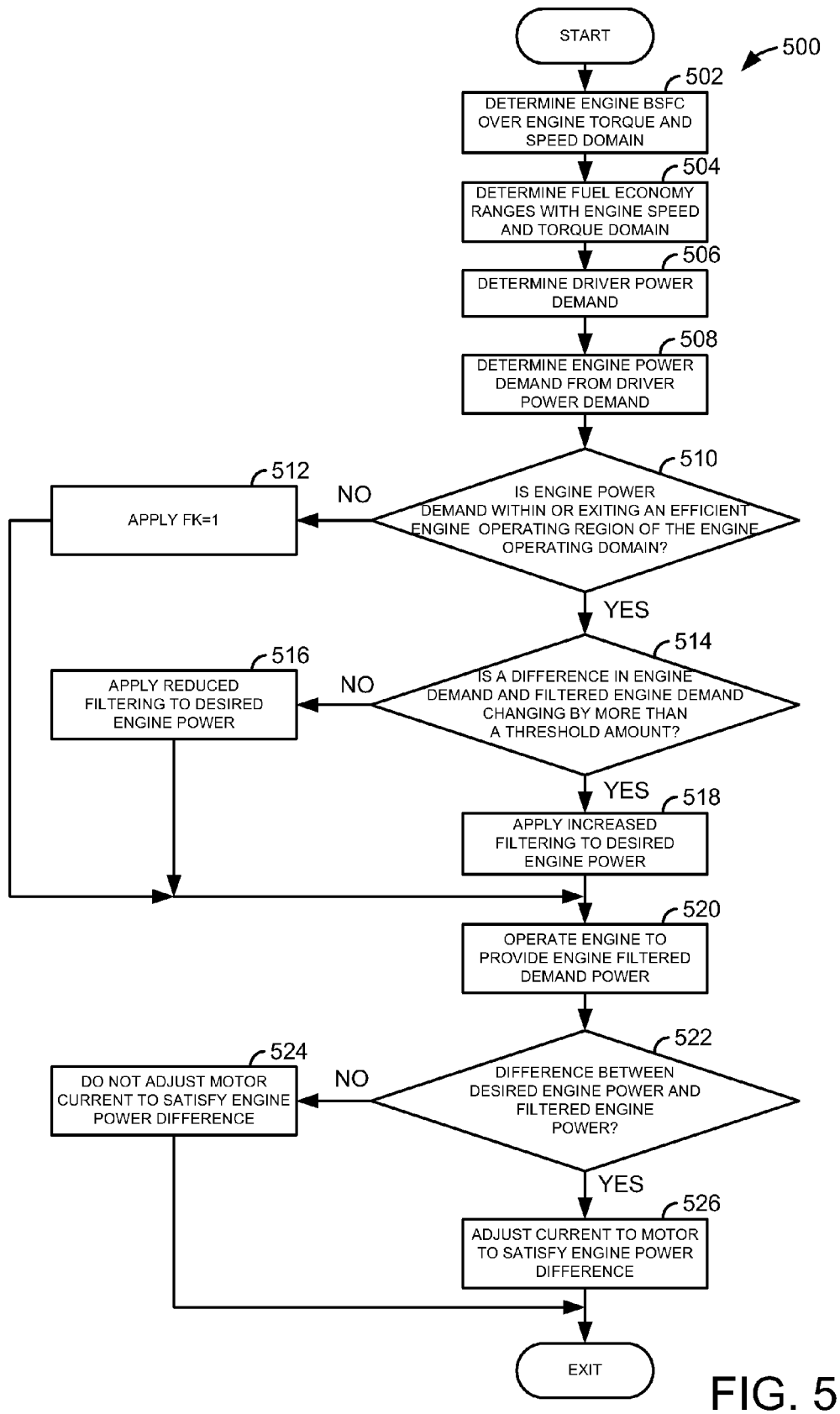
FIG. 5 shows an example method for operating an engine in a hybrid vehicle driveline.

The present description is related to improving engine efficiency over a hybrid vehicle's operating range. The hybrid vehicle driveline may include an engine as shown in FIG. 1 that may be selectively coupled to a motor/generator to provide input to a transmission as is shown in FIG. 2. Alternatively, the engine of FIG. 1 may be included in a power split hybrid driveline with a motor and a generator as is shown in FIG. 3. Example efficient engine operating ranges within an engine operating domain are shown in FIG. 4. Finally, FIG. 5 shows a method for increasing an amount of time an engine operates at efficient operating conditions.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transient) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2-3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1–N where N is an integer number between 4-25) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Referring now to FIG. 3, an example of an alternative driveline 300 is shown. Driveline 300 includes engine 10 and torque actuator 204 as described in FIGS. 1 and 2. Engine 10 provides torque to planetary gear set 302 and generator 304 operates in a speed control mode to control engine torque delivery to single ratio gearing system 310. Output from generator 304 provides electrical energy to energy storage device 275 and motor 306. Electrical energy storage device 275 may supply electrical power to motor 306 when engine 10 is not operating. Electrical energy storage device may be a battery, capacitor, or other electrical energy storage device. Motor 306 may also be operated in a generator mode for regenerative braking Torque from engine 10 and motor 306 may be combined in single ratio gearing system 10 to provide torque to vehicle wheels 216 via a mechanical power path. Controller 12 controls operation of engine 10, generator 304, and motor 306 to adjust power supplied to vehicle wheels 216. Thus, the driveline of FIG. 3 does not include a transmission with multiple stepped gear ratios for delivering engine and motor power to vehicle wheels.

Thus, the systems of FIGS. 1-3 provide for a vehicle system, comprising: an engine; a motor/generator in mechanical communication with the engine; and a controller including non-transitory instructions executable to filter a desired engine power such that a filtered engine power remains in a defined efficient engine operating region stored in memory for a first time interval when the desired engine power is outside of the defined efficient engine operating region. The vehicle system further comprises additional instructions to filter the desired engine power such that filtered engine power exits a region outside of the defined efficient engine operating region in a second time interval when the desired engine power exits the region outside of the defined efficient engine operating region and enters the defined efficient engine operating region, and where the first time interval is longer than the second time interval.

In some examples, the vehicle system further comprises additional instructions for adjusting power of the motor/generator in response to a difference between the desired engine power and the filtered engine power. The vehicle system further comprises a driveline disconnect clutch positioned between the engine and the motor/generator. The vehicle system further comprises instructions for determining a plurality of filter constants that operate on the desired engine power to provide the filtered engine power. The vehicle system further comprises additional instructions to operate the engine at the filtered engine power.

Referring now to FIG. 4, a plot of a map of engine brake specific fuel consumption including defined efficient engine operating regions is shown. The map and defined efficient engine operating regions may be incorporated as executable instructions into non-transitory memory of the controller shown in FIGS. 1-3.

The X axis represents engine speed and the Y axis represents engine crankshaft torque, the X and Y axes describing an engine operating domain. Curve 402 represents a maximum engine torque curve that extends from an engine idle speed to maximum engine speed. Curves 403, 405, 407, and 409 represent boundaries of constant engine brake specific fuel consumption. Brake specific fuel consumption for curve 403 may be greater than brake specific fuel consumption for curve 409. Likewise, brake specific fuel consumption for curve 405 may be greater than brake specific fuel consumption for curve 409. The specific brake specific fuel consumption values for one of the curves shown may be different from each of the other curves shown.

The area enclosed by dashed line 404 represents a first efficient engine operating region within the engine operating domain. In this example, the extents of dashed line 404 are near the brake specific fuel consumption curve 409. The area enclosed by dashed line 406 represents a second efficient engine operating region within the engine operating domain. In this example, the extents of dashed line 406 are near the brake specific fuel consumption curve 405. It may be desirable to operate the engine within the efficient engine operating regions enclosed by dashed lines 404 and 406 to improve engine operating efficiency. The longer the engine operates inside of the regions enclosed by dashed lines 404 and 406, as opposed to operating outside of the regions enclosed by dashed lines 404 and 406, the more efficient the engine operates over a driving cycle.

In this example, the regions enclosed by dashed lines 404 and 406 are quadrilateral, but the regions may follow brake specific fuel consumption curves or take the form of other shapes. For example, the regions may be elliptical, square, circular, or described as a function.

Referring now to FIG. 5, an example method for operating an engine in a hybrid vehicle driveline is shown. The method of FIG. 5 may be included in the systems of FIGS. 1-3 as instructions stored in non-transitory memory. The method of FIG. 5 may operate to extend engine operating time in defined efficient engine operating regions as illustrated in the regions bounded by curves 404 and 406 of FIG. 4.

At 502, method 500 determines brake specific fuel consumption (BSFC) over and engine power or speed and torque domain. In one example, an engine is operated on a dynamometer and BSFC is mapped to a function indexed based on engine speed and load as shown in FIG. 4. In other examples, the BSFC may be determined as vehicle operating conditions change during a vehicle drive cycle. The BSFC mapping may be stored to controller memory. Method 500 proceeds to 504 after the BSFC map is determined.

At 504, method 500 efficient engine operating regions are determined and stored to memory. In one example, efficient engine operating regions may be defined by entering engine speed and load conditions into memory. The engine speed and load conditions are boundaries for one or more efficient engine operating regions. For example, 2000 RPM, 100 NM; 1000 RPM, 100 NM; 1000 RPM, 125 NM; 2000 RPM, 125 NM; form boundary extents of an efficient engine operating region. A plurality of engine power levels is included within the efficient engine operating region. The engine operates in an efficient engine operating region when the engine is operating at conditions within the efficient operating region. For example, based on the previously described efficient engine operating region, the engine is operating within the efficient engine operating region at 1500 RPM and 110 NM. In other examples, the efficient engine operating region may be defined by a function within the engine operating domain or in other ways. Additionally, there may be a plurality of efficient engine operating regions within the engine operating domain. Method 500 proceeds to 506 after efficient engine operating regions are defined and stored to controller memory.

At 506, method 500 determines a driver power demand. In one example, a position of accelerator pedal 134 and wheel speed from wheels 216 is converted to a driver demand torque via a transfer function. The driver demand torque and the vehicle speed are multiplied to provide a desired or requested wheel power. The desired or requested wheel power is the basis for determining a transmission input power (e.g., a torque converter impeller power). The wheel power is transformed into the torque converter impeller power by multiplying the wheel power by the engaged gear ratio and a torque converter transfer function, if the hybrid driveline includes a step ratio transmission and torque converter. If the hybrid driveline includes a fixed gear set, the desired wheel power is multiplied by the ratio of the fixed gear set to determine the desired transmission input power. Method 500 proceeds to 508 after driver demand power is determined.

At 508, method 500 determines desired engine power. Once driver power demand is determined, the driver power demand may be split into a desired engine power and a desired motor power. In one example, the battery state of charge, battery discharge limits, vehicle speed, and desired transmission input power are input to power arbitration algorithm and desired engine power and desired motor/generator power are output. Method 500 proceeds to 510 after driver power demand is determined.

At 510, method 500 judges if desired engine power is within or exiting an efficient engine operating region of the engine operating domain. In some examples, it may be judged that desired engine power is within an efficient engine operating region if engine speed and load index selected entries of a table. In other examples, if the desired engine power is within the extents of a defined boundary (e.g., inside the extents of lines 404 of FIG. 4) of an efficient engine operating region as shown in FIG. 4, the answer is yes and method 500 proceeds to 514. Otherwise, the answer is no and method 500 proceeds to 512. Further, method 500 may proceed to 514 if desired engine power is exiting an efficient engine operating region. For example, if during a past execution of method 500, the desired engine power was within an efficient engine operating region, and during a present execution of method 500, the desired engine power is operating outside the efficient engine operating region, it may be determined that the desired engine power is exiting an efficient engine operating region. If the desired engine power is exiting the extents of a defined boundary (e.g., outside the extents of lines 404 of FIG. 4) of an efficient engine operating region, the answer is yes and method 500 proceeds to 514. Otherwise, the answer is no and method 500 proceeds to 512.

At 512, method 500 applies a filter constant value of 1.0 to a filter operating on desired engine power. In one example, the digitally implemented filter allows an input of the filter to proceed to the filter's output without attenuation, amplification, or phase delay when the filter constant value of 1 is applied to the filter. Thus, the desired engine power may be output as the filtered engine power. Method 500 proceeds to 520 after the filter constant value of 1.0 is applied to the filter operating on desired engine power to produce filtered engine power.

At 514, method 500 judges if a difference in desired engine power and filtered engine power is more than a threshold amount. If so, the answer is yes and method 500 proceeds to 518. In not, the answer is no and method 500 proceeds to 516. The filtered engine power is determined at 518, 516, or 512. Thus, the filtered engine power the desired engine power is compared with is determined one execution cycle of method 500 earlier than the desired engine power.

At 516, method 500 applies a reduced level of filtering as compared to the filtering applied at 518. Further, the filtering at 516 is increased as compared to the filtering at 512. For example, if the filter at 518 is implemented as a low pass filter, method 500 provides less filter produced phase delay and less attenuation or reduction in amplitude when desired engine power is filtered at 516 as opposed to being filtered at 518. Thus, as the difference between desired engine power and filtered engine power increases, the filtering effect is decreased. In other words, the filtered engine power more closely follows or resembles the desired engine power. Method 500 filters desired engine power to produced filtered engine power and proceeds to 520. In one example, the filter applied to the desired engine power is a first order low pass digital filter. Method 500 proceeds to 520 after desired engine power is filtered to provide filtered engine power.

At 518, method 500 applies an increased level of filtering as compared to the filtering applied at 516. For example, if the filter at 516 is implemented as a low pass filter, method 500 provides increased filter produced phase delay and increased attenuation in amplitude when desired engine power is filtered at 518 as opposed to being filtered at 516. Thus, as the difference between desired engine power and filtered engine power decreases, the filtering effect is increased. In other words, the filtered engine power follows or resembles the desired engine power less closely. Method 500 filters desired engine power to produced filtered engine power and proceeds to 520. In one example, the filter applied to the desired engine power is a first order low pass digital filter. Method 500 proceeds to 520 after desired engine power is filtered to provide filtered engine power.

At 520, method 500 operates the engine to provide the desired engine power. In one example, engine torque is adjusted based on the present engine speed to provide the filtered engine power. The filtered engine power may be more heavily filtered if the desired engine power was filtered at 518 as compared to if the desired engine power was filtered at 512 or 516. The engine torque may be adjusted via increasing or decreasing the engine throttle opening and fuel amount supplied to the engine. Further, in some examples, engine spark timing may be advanced or retarded to operate the engine at the filtered engine power. Method 500 proceeds to 522 after torque actuators are adjusted to operate the engine at the filtered engine power.

At 522, method 500 judges if the absolute value of the difference between desired engine power and filtered engine power is less than a threshold. In one example, method 500 subtracts the filtered engine power from the desired engine power to determine a difference. If method 500 judges if the absolute value of a difference between desired engine power and filtered engine power is less than a threshold, the answer is yes and method 500 proceeds to 526. Otherwise, the answer is no and method 500 proceeds to 524.

At 524, method 500 does not adjust motor current. The motor current is simply adjusted based on the output of the arbitration algorithm described at 508. Method 500 proceeds to exit.

At 526, method 500 adjusts current supplied to the motor based on the difference between the desired engine torque and the filtered engine torque. If the desired engine torque is greater than the filtered engine torque, motor torque is increased via increasing motor current. If the desire engine torque is less than the filtered engine torque, the motor torque is decreased via decreasing motor current. Method 500 proceeds to exit after motor current is adjusted.

Thus, engine power may be filtered to increase an amount of time an engine operates at efficient engine operating conditions. Further, desired engine power may be filtered less to more closely follow desired engine power when engine power is out of an efficient engine operating region or if a difference between desired engine power and filtered engine power is increasing.

The method of FIG. 5 provides for a method, comprising: defining an efficient engine operating region over an engine operating domain; applying a first filter to a desired engine power if the desired engine power is within the efficient engine operating region; applying a second filter to the desired engine power if the desired engine power is not within the efficient engine operating region; and commanding an engine to operate at a filtered engine power. The method includes where the efficient engine operating region is defined in controller memory.

In some examples, the method includes where the efficient engine operating region is based on engine brake specific fuel consumption. The method also includes where the filtered engine power is based on applying the first filter or the second filter to the desired engine power. The method includes where the first and second filters have different filter constants. The method further comprises defining a plurality of efficient engine operating regions over the engine operating domain. The method further comprises providing at least two filter constants for the plurality of efficient engine operating regions.

The method of FIG. 5 also provides for a method, comprising: defining an efficient engine operating region over an engine operating domain; applying a first filter to a desired engine power if the desired engine power is within or exiting the efficient engine operating region, the first filter based on a difference in the desired engine power and a filtered engine power; applying a second filter to the desired engine power if the desired engine power is not within the efficient engine operating region; and commanding an engine to operate at the filtered engine power. The method includes where the efficient engine operating region is based on engine brake specific fuel consumption. The method further comprises adjusting power of a motor in response to a difference between the desired engine power and the filtered engine power.

In some examples, the method includes where the filtered engine power is based on applying the first filter or the second filter to the desired engine power. The method further comprises defining a plurality of efficient engine operating regions over the engine operating domain. The method further comprises providing at least two filter constants for the plurality of efficient engine operating regions. The method includes where the first filter includes a first filter constant and where the second filter includes a second filter constant.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   defining an efficient engine operating region over an engine operating domain;
   applying a first filter to a desired engine power to provide a filtered engine power via a controller if the desired engine power is within the efficient engine operating region;
   applying a second filter to the desired engine power to provide the filtered engine power via the controller if the desired engine power is not within the efficient engine operating region; and commanding the engine to operate at the filtered engine power via the controller.

2. The method of claim 1, where the efficient engine operating region is defined in controller memory, and further comprising applying increased filtering to the desired engine power via a low pass filter and the controller in response to a difference in the desired engine power and the filtered engine power exceeding a threshold amount.

3. The method of claim 1, where the efficient engine operating region is based on engine brake specific fuel consumption.

4. The method of claim 1, where the filtered engine power is based on applying the first filter or the second filter to the desired engine power.

5. The method of claim 4, where the first and second filters have different filter constants.

6. The method of claim 1, further comprising defining a plurality of efficient engine operating regions over the engine operating domain via the controller.

7. The method of claim 6, further comprising providing at least two filter constants for the plurality of efficient engine operating regions via the controller.

8. A method for operating an engine, comprising:
   defining an efficient engine operating region over an engine operating domain;
   applying a first filter to a desired engine power to provide a filtered engine power via a controller if the desired engine power is within or exiting the efficient engine operating region, the first filter a low pass filter based on a difference in the desired engine power and the filtered engine power;
   applying a second filter to the desired engine power to provide the filtered engine power via the controller if the desired engine power is not within the efficient engine operating region; and
   commanding the engine to operate at the filtered engine power via the controller.

9. The method of claim 8, where the efficient engine operating region is based on engine brake specific fuel consumption.

10. The method of claim 8, further comprising adjusting power of a motor via the controller in response to the difference between the desired engine power and the filtered engine power.

11. The method of claim 8, where the filtered engine power is based on applying the first filter or the second filter to the desired engine power, and further comprising applying increased filtering to the desired engine power via the low pass filter and the controller in response to the difference in the desired engine power and the filtered engine power exceeding a threshold amount.

12. The method of claim 8, further comprising defining a plurality of efficient engine operating regions over the engine operating domain via the controller.

13. The method of claim 12, further comprising providing at least two filter constants for the plurality of efficient engine operating regions via the controller.

14. The method of claim 8, where the first filter includes a first filter constant and where the second filter includes a second filter constant.

15. A vehicle system, comprising:
   an engine;
   a motor/generator in mechanical communication with the engine; and
   a controller including non-transitory instructions executable to filter a desired engine power such that a filtered engine power remains in a defined efficient engine operating region stored in memory for a first time interval when the desired engine power is outside of the defined efficient engine operating region, where the desired engine power is filtered via a low pass filter based on a difference in the desired engine power and the filtered engine power.

16. The vehicle system of claim 15, further comprising additional instructions to filter the desired engine power such that filtered engine power exits a region outside of the defined efficient engine operating region in a second time interval when the desired engine power exits the region outside of the defined efficient engine operating region and enters the defined efficient engine operating region, and where the first time interval is longer than the second time interval.

17. The vehicle system of claim 15, further comprising additional instructions for adjusting power of the motor/generator in response to the difference between the desired engine power and the filtered engine power.

18. The vehicle system of claim 15, further comprising a driveline disconnect clutch positioned between the engine and the motor/generator.

19. The vehicle system of claim 15, further comprising instructions for determining a plurality of filter constants that operate on the desired engine power to provide the filtered engine power.

20. The vehicle system of claim 15, further comprising additional instructions to operate the engine at the filtered engine power.

\* \* \* \* \*